US010099964B2

(12) United States Patent
Tauchi

(10) Patent No.: US 10,099,964 B2
(45) Date of Patent: Oct. 16, 2018

(54) DIELECTRIC COMPOSITION, DIELECTRIC ELEMENT, ELECTRONIC COMPONENT AND LAMINATED ELECTRONIC COMPONENT

(71) Applicant: EPCOS AG, Munich (DE)

(72) Inventor: Goushi Tauchi, Tokyo (JP)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/510,623

(22) PCT Filed: Sep. 8, 2015

(86) PCT No.: PCT/EP2015/070480
§ 371 (c)(1),
(2) Date: Mar. 10, 2017

(87) PCT Pub. No.: WO2016/038026
PCT Pub. Date: Mar. 17, 2016

(65) Prior Publication Data
US 2017/0190627 A1    Jul. 6, 2017

(30) Foreign Application Priority Data

Sep. 12, 2014 (JP) ................ 2014-186921

(51) Int. Cl.
| | |
|---|---|
| *C04B 35/475* | (2006.01) |
| *H01G 4/12* | (2006.01) |
| *C04B 35/462* | (2006.01) |
| *C04B 35/47* | (2006.01) |
| *H01B 3/12* | (2006.01) |
| *C04B 35/626* | (2006.01) |
| *C04B 35/634* | (2006.01) |

(Continued)

(52) U.S. Cl.
CPC ......... *C04B 35/475* (2013.01); *C04B 35/462* (2013.01); *C04B 35/47* (2013.01);
(Continued)

(58) Field of Classification Search
CPC .................................................. C04B 35/475
See application file for complete search history.

(56) References Cited

U.S. PATENT DOCUMENTS

| | | | |
|---|---|---|---|
| 7,145,198 B2* | 12/2006 | Sakashita | C04B 35/475 257/310 |
| 7,580,241 B2* | 8/2009 | Sakashita | C04B 35/462 361/306.1 |

(Continued)

FOREIGN PATENT DOCUMENTS

| | | |
|---|---|---|
| JP | 2004182532 A | 7/2004 |
| JP | 2005022891 A | 1/2005 |
| JP | 2013542161 A | 11/2013 |

OTHER PUBLICATIONS

Herabut, A., et al., "Effects of Substitution in A- and B-site Cations of Bi0.5Na0.5TiO3," Proceedings of the Tenth IEEE International Symposium on Applications of Ferroelectrics, vol. 2, Aug. 18, 1996, pp. 775-778.

(Continued)

*Primary Examiner* — Karl E Group
(74) *Attorney, Agent, or Firm* — Slater Matsil, LLP

(57) ABSTRACT

A dielectric composition, a dielectric element, an electronic component and a laminated electronic component are disclosed. In various embodiment, the dielectric composition includes a main component represented by $(Bi_a Na_b Sr_c Ln_d)TiO_3$, wherein Ln is at least one element selected from the group consisting of: La, Ce, Pr, Nd, Sm, Eu, Gd, Tb, Dy, Ho and Yb, and wherein a, b, c and d satisfy the following: $0<a<0.50$, $0<b<0.50$, $0<c\le0.80$, $0<d\le0.20$, and $0.90\le a+b+c+d\le1.05$.

13 Claims, 2 Drawing Sheets

(51) Int. Cl.
*C04B 35/638* (2006.01)
*C04B 35/64* (2006.01)
*H01G 4/30* (2006.01)

(52) U.S. Cl.
CPC .... *C04B 35/6262* (2013.01); *C04B 35/62645* (2013.01); *C04B 35/638* (2013.01); *C04B 35/63416* (2013.01); *C04B 35/64* (2013.01); *H01B 3/12* (2013.01); *H01G 4/1218* (2013.01); *H01G 4/1227* (2013.01); *C04B 2235/3201* (2013.01); *C04B 2235/3213* (2013.01); *C04B 2235/3224* (2013.01); *C04B 2235/3227* (2013.01); *C04B 2235/3229* (2013.01); *C04B 2235/3298* (2013.01); *C04B 2235/604* (2013.01); *C04B 2235/656* (2013.01); *C04B 2235/6567* (2013.01); *C04B 2235/768* (2013.01); *C04B 2235/77* (2013.01); *C04B 2235/79* (2013.01); *C04B 2235/96* (2013.01); *H01G 4/30* (2013.01)

(56) References Cited

U.S. PATENT DOCUMENTS

| | | | | |
|---|---|---|---|---|
| 8,043,987 B2 * | 10/2011 | Chen | ............... | C04B 35/475 252/62.9 PZ |
| 9,054,310 B2 | 6/2015 | Hoffmann et al. | | |
| 9,530,562 B2 * | 12/2016 | Tauchi | ............... | H01G 4/1218 |
| 9,530,563 B2 * | 12/2016 | Imura | ............... | H01G 4/1218 |
| 9,773,616 B2 * | 9/2017 | Tauchi | ............... | C04B 35/462 |
| 9,776,925 B2 * | 10/2017 | Imura | ............... | C04B 35/462 |
| 2010/0009841 A1 | 1/2010 | Chen et al. | | |
| 2013/0228715 A1 | 9/2013 | Hoffmann et al. | | |
| 2014/0016243 A1 * | 1/2014 | Suzuki | ............... | H01G 4/1227 361/321.4 |
| 2017/0243696 A1 * | 8/2017 | Hirose | ............... | H01G 4/30 |

OTHER PUBLICATIONS

Intatha, U., et al., "Preparation of Lead-Free Piezoelectric Ceramics from (1-x)BNLT-xBT Ceramics System," Ferroelectrics, vol. 358, No. 1, Oct. 3, 2007, pp. 129-133.

Pengpat, K., et al., "Morphotropic phase boundary and electrical properties of lead-free bismuth sodium lanthanum titanate—barium titanate," Journal of Electroceramics, vol. 16, Issue 4, Jul. 1, 2006, pp. 301-305.

Vintila, R., et al., "Effect of A-Site Substitutions on the Microstructure and Dielectric Properties of Bismuth Sodium Titanate-Based Ceramics Exhibiting Morphotropic Phase Boundary," Advances in Electronic Ceramic Materials: Ceramic Engineering and Science Proceedings, vol. 26, No. 5, Jan. 1, 2005, pp. 117-124.

* cited by examiner

DIELECTRIC COMPOSITION, DIELECTRIC ELEMENT, ELECTRONIC COMPONENT AND LAMINATED ELECTRONIC COMPONENT

This patent application is a national phase filing under section 371 of PCT/EP2015/070480, filed Sep. 8, 2015, which claims the priority of Japanese patent application 2014-186921, filed Sep. 12, 2014, each of which is incorporated herein by reference in its entirety.

TECHNICAL FIELD

The present invention relates to a dielectric composition and a dielectric element employing same, and to an electronic component and a laminated electronic component. More specifically, the present invention relates to a dielectric composition, a dielectric element, an electronic component and a laminated electronic component which are advantageously used for medium- and high-voltage applications with a relatively high rated voltage.

BACKGROUND

In recent years there has been a great demand for miniaturization of dielectric elements as electronic circuits reach higher densities, and miniaturization of electronic components such as laminated ceramic capacitors together with increased capacity are rapidly progressing, while the applications thereof are also expanding. Various characteristics are required as this takes place.

For example, medium- and high-voltage capacitors which are used in devices such as engine electric computer modules (ECMs), fuel injection devices, electronic control throttles, inverters, converters, high-intensity discharge (HID) headlamp units, hybrid engine battery control units and digital still cameras often have a rated voltage in excess of 100 V because they are used in circuits for providing a high voltage boost. That is to say, medium- and high-voltage capacitors such as these need a high dielectric constant and high capacitance when a high DC bias is applied.

However, conventional dielectric compositions are designed on the assumption that they will be used when a low DC bias of the order of 1 V/μm is applied, for example. This means that if an electronic component having a dielectric layer comprising a conventional dielectric composition is used when a high DC bias is applied, there is a problem in that the dielectric constant and the capacitance are reduced. This problem becomes more marked the higher the DC bias, especially in laminated ceramic capacitors which have very thin layers, because the dielectric constant and capacitance tend to decrease.

In order to solve the abovementioned problem, Patent Document 1 mentioned below describes a dielectric composition which contains a main component comprising: barium titanate having an alkali metal oxide content of 0.02 wt % or less; at least one compound selected from among europium oxide, gadolinium oxide, terbium oxide, dysprosium oxide, holmium oxide, erbium oxide, thulium oxide, and ytterbium oxide; barium zirconate, magnesium oxide and manganese oxide, the main component being represented by the following compositional formula: $\{BaO\}_m TiO_2 + \alpha R_2O_3 + \beta BaZrO_3 + \gamma MgO + gMnO$ (where $R_2O_3$ is at least one compound selected from among $Eu_2O_3$, $Gd_2O_3$, $Tb_2O_3$, $Dy_2O_3$, $Ho_2O_3$, $Er_2O_3$, $Tm_2O_3$ and $Yb_2O_3$; and α, β, γ, and g represent a mole ratio and are within the following ranges: $0.001 \leq \alpha \leq 0.06$, $0.005 \leq \beta \leq 0.06$, $0.001 < \gamma \leq 0.12$, $0.001 < g \leq 0.12$, $\gamma + g \leq 0.13$, and $1.000 < m \leq 1.035$); and the dielectric composition contains, as an auxiliary component, silicon oxide in an amount of 0.2-5.0 mol as $SiO_2$ equivalent, with respect to 100 mol of the main component.

However, although a dielectric composition such as that described in Patent Document 1 has a relatively large dielectric constant when a DC bias of 5 V/μm is applied, a dielectric composition having a high dielectric constant under an even higher DC bias voltage of the order of 8 V/μm, for example, would be desirable in order to cope with the thinner layers accompanying the miniaturization and higher capacity of medium- and high-voltage capacitors.

In addition, there is a need for a sufficiently large withstand field (e.g., 14 V/μm or greater) under an environment in which a DC bias of the order of 8 V/μm is applied.

SUMMARY OF THE INVENTION

Embodiments of the invention provide a dielectric composition which is advantageously used for medium- and high-voltage applications with a relatively high rated voltage, which has a relatively high dielectric constant of 800 or greater, and which also has a withstand field of 14 V/μm or greater when a DC bias of at least 8 V/μm is applied. Further embodiments of the invention provide a dielectric element employing the dielectric composition, an electronic component, and a laminated electronic component.

Moreover, according to embodiments of the present invention, a direct current electric field which is applied to the dielectric composition, dielectric element, electronic component and laminated electronic component is referred to as a DC (direct current) bias. Furthermore, the characteristic of the dielectric constant and capacitance of the dielectric composition etc. varying as a result of a DC bias being applied is referred to as the DC bias characteristics. Furthermore, the electric field at which breakdown occurs is referred to as the withstand field.

Embodiments of the invention provide a dielectric composition that has a main component represented by $(Bi_a Na_b Sr_c Ln_d)TiO_3$, wherein Ln is at least one selected from among: La, Ce, Pr, Nd, Sm, Eu, Gd, Tb, Dy, Ho and Yb, and wherein a, b, c and d satisfy the following: $0 < a < 0.50$, $0 < b < 0.5$, $0 < c \leq 0.80$, $0 < d \leq 0.20$, and $0.90 \leq a+b+c+d \leq 1.05$.

Embodiments provide that a, b, c and d represent the ratio of the number of atoms of Bi, Na, Sr and Ln when there is one Ti atom.

The dielectric composition according to the present invention has the abovementioned constitution, and as a result it is possible to achieve a relatively high dielectric constant of 800 or greater and a withstand field of 14 V/μm or greater when a DC bias of at least 8 V/μm is applied.

Preferably, a, b, c and d satisfy the following: $0.05 < a \leq 0.40$, $0.05 < b \leq 0.40$, $0 < c \leq 0.70$, $0 < d \leq 0.10$, and $0.90 \leq a+b+c+d \leq 1.05$.

A dielectric element according to the present invention comprises the abovementioned dielectric composition.

An electronic component according to the present invention is provided with a dielectric layer comprising the abovementioned dielectric composition.

A laminated electronic component according to the present invention has a laminated portion formed by alternately laminating an internal electrode layer and a dielectric layer comprising the abovementioned dielectric composition.

In various embodiments the inventive dielectric element, electronic component and laminated electronic component are advantageously used in a medium- and high-voltage capacitor with a relatively high rated voltage. The present invention makes it possible to provide a dielectric composition having a relatively high dielectric constant of 800 or greater and a withstand field of 14 V/µm or greater when a DC bias of at least 8 V/µm is applied, and also to provide a dielectric element employing the dielectric composition, an electronic component, and a laminated electronic component.

There is no particular limitation as to the applications of the dielectric element comprising the abovementioned dielectric composition, electronic component and laminated electronic component, but they are useful in a circuit protection snubber capacitor or smoothing capacitor in which a high dielectric constant is required when a high DC bias is applied.

In addition, the dielectric composition according to the present invention has excellent characteristics without containing lead. As a result, the inventive dielectric composition, dielectric element, electronic component and laminated electronic component are outstanding from an environmental point of view.

DETAILED DESCRIPTION OF ILLUSTRATIVE EMBODIMENTS

A preferred mode of embodiment of the present invention will be described below, in some cases with reference to the figures. It should be noted that in the figures, the same reference symbols are used for elements which are the same or equivalent and a duplicate description will not be given.

Figure 1:
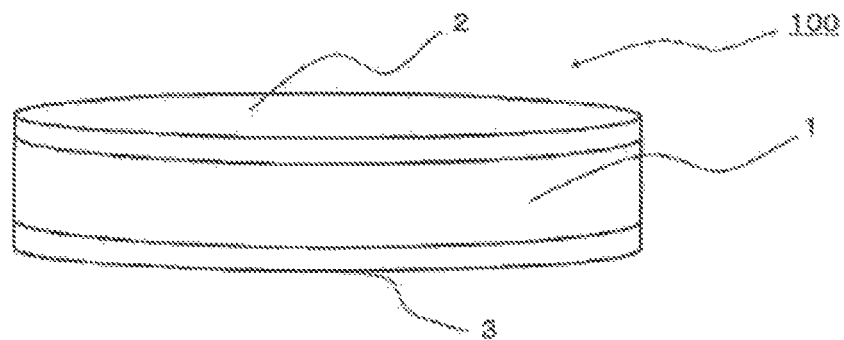
FIG. 1 is a schematic diagram of a ceramic capacitor according to a mode embodiment of the present invention.

As shown in FIG. 1, a single-layer ceramic capacitor 100 according to a mode of embodiment of the present invention comprises a disk-shaped dielectric body 1 and a pair of electrodes 2, 3. The single-layer ceramic capacitor 100 is obtained by forming the electrodes 2, 3 on both surfaces of the dielectric body 1. There is no particular limitation as to the shapes of the dielectric body 1 and the electrodes 2, 3. Furthermore, there is no particular limitation as to the dimensions thereof either, and suitable dimensions should be set in accordance with the application.

The dielectric body 1 is formed by a dielectric composition having a main component represented by the general formula: $(Bi_a Na_b Sr_c Ln_d)TiO_3$.

In the abovementioned general formula, Ln is at least one selected from among: La, Ce, Pr, Nd, Sm, Eu, Gd, Tb, Dy, Ho and Yb. In addition, Ln is more preferably at least one selected from among: La, Ce, Nd, Sm, Gd, Dy and Yb. Among these, Ln is especially preferably at least one selected from among La, Gd and Yb, in order to further increase the withstand field.

In the abovementioned general formula, a satisfies $0<a<0.50$. If a is 0 or equal to or greater than 0.50, there is a possibility of a drop in the dielectric constant of the dielectric composition when a DC bias of 8 V/µm is applied, or a possibility of the withstand field decreasing and breakdown occurring.

Furthermore, a preferably satisfies $0.05<a≤0.40$, and more preferably satisfies $0.10<a≤0.40$. By controlling a to this kind of range, it is possible to efficiently increase the dielectric constant and withstand field of the dielectric composition. Furthermore, this kind of range is efficient from the point of view of further reducing starting material costs.

In the abovementioned general formula, b satisfies $0<b<0.50$. If b is 0 or equal to or greater than 0.50, there is a possibility of a drop in the dielectric constant of the dielectric composition when a DC bias of 8 V/µm is applied, or a possibility of the withstand field decreasing and breakdown occurring.

Furthermore, b preferably satisfies $0.05<b≤0.40$, and more preferably satisfies $0.10<b≤0.40$. By controlling b to this kind of range, it is possible to efficiently increase the dielectric constant and withstand field of the dielectric composition.

In the abovementioned general formula, c satisfies $0<c≤0.80$. If c is 0 or greater than 0.80, there is a possibility of a drop in the dielectric constant of the dielectric composition when a DC bias of 8 V/µm is applied, or a possibility of the withstand field decreasing and breakdown occurring.

Furthermore, c more preferably satisfies $0<c≤0.70$. By controlling c to this kind of range, it is possible to efficiently increase the dielectric constant and withstand field of the dielectric composition.

In the abovementioned general formula, d satisfies $0<d<0.20$. If d is o or greater than 0.20, there is a possibility of a drop in the dielectric constant of the dielectric composition when a DC bias of 8 V/µm is applied, or a possibility of the withstand field decreasing and breakdown occurring.

Furthermore, d more preferably satisfies $0<d≤0.10$. By controlling d to this kind of range, it is possible to efficiently increase the dielectric constant and withstand field of the dielectric composition. Furthermore, this kind of range is efficient from the point of view of further reducing starting material costs.

In addition, in the abovementioned general formula, a, b, c and d satisfy $0.90≤a+b+c+d≤1.05$. If a+b+c+d is less than 0.90 or greater than 1.05, it is not possible to obtain an adequate sintered density and the insulation resistance is reduced, so it is difficult to use the dielectric composition when a high DC bias is applied. That is to say, in such cases the withstand field is excessively low and there is a possibility of breakdown occurring.

That is to say, the dielectric composition according to this mode of embodiment makes it possible to achieve a relatively high dielectric constant of 800 or greater and a withstand field of 14 V/µm or greater when a DC bias of 8 V/µm is applied.

The dielectric according to this mode of embodiment is a combination of ferroelectric compositions, and by providing this specific combination, it is possible to achieve a relatively high dielectric constant of 800 or greater and a withstand field of 14 V/µm or greater when a DC bias of 8 V/µm is applied.

The content of the main component represented by the abovementioned general formula is preferably at least 90 mass % based on the dielectric composition as a whole, from the point of view of obtaining a dielectric constant which is sufficient for practical use as a dielectric composition. Furthermore, the dielectric composition may contain one or more oxides of elements selected from: Zn, Mn, Co, Ni, Al and Si, as auxiliary components in addition to the main component. In addition, the dielectric composition may include impurities such as P and Zr which may become mixed in during the production process.

The constitution of the dielectric composition may be measured by X-ray fluorescence analysis or by inductively coupled plasma (ICP) atomic emission spectroscopy.

The relative density of the abovementioned dielectric composition is preferably 95% or greater when the theoretical density is 100%. In this case, in the present specification, the relative density refers to the proportion of the actual measured value of the density with respect to the theoretical density. It should be noted that the theoretical density of the dielectric composition may be calculated using the lattice constant obtained by means of X-ray diffraction and the stoichiometric ratio obtained on the basis of perfect crystals, for example. The actual measured value of the density of the dielectric composition may be obtained by means of the Archimedes method, for example. The relative density of the dielectric composition may be adjusted by varying the firing temperature or firing time etc.

An example of a method for producing the ceramic capacitor shown in FIG. 1 will be described below.

First of all, powders of bismuth oxide ($Bi_2O_3$), sodium carbonate ($Na_2CO_3$), strontium carbonate ($SrCO_3$), lanthanum hydroxide ($La(OH)_3$), cerium oxide ($Ce_2O_3$), neodymium oxide ($Nd_2O_3$), samarium oxide ($Sm_2O_3$), gadolinium oxide ($Gd_2O_3$), dysprosium oxide ($Dy_2O_3$), ytterbium oxide ($Yb_2O_3$) and titanium oxide ($TiO_2$) etc. are prepared as the starting materials of the dielectric body 1.

The abovementioned powder starting materials are then weighed out in such a way that the dielectric composition which has been fired (sintered compact) satisfies the composition of the dielectric composition according to this mode of embodiment.

The weighed starting material powders are then wet-mixed using a ball mill or the like. A calcined article is obtained by calcining the mixture obtained by wet-mixing. At this point, the calcination is normally carried out under air. Furthermore, the calcination temperature is preferably 700-900° C. and the calcination time is preferably 1-10 hours.

The resulting calcined article is wet-ground in a ball mill or the like, after which it is dried to obtain calcined powder. A binder is then added to the resulting calcined powder and press molding is performed to obtain a molded article. There is no particular limitation as to the binder which may be used provided that it is a binder which is conventionally employed in this technical field. Specific examples of binders which may be cited include polyvinyl alcohol (PVA) and the like. There is no particular limitation as to the amount of binder which is added, but an amount of 1-5 wt % is preferably added when the calcined powder is taken as 100 wt %. In addition, the molding pressure during press molding is preferably of the order of $5 \times 10^2$ MPa. There is no particular limitation as to the shape of the molded article. According to this mode of embodiment, a disk shape is formed, but a cuboid shape or another shape may equally be formed.

The dielectric body 1 is obtained by firing the resulting molded article. Here, the firing is normally carried out under air. Furthermore, the firing temperature is preferably 950-1400° C., and the firing time is preferably 2-10 hours.

The electrodes 2, 3 are then formed on both surfaces of the resulting dielectric body 1. There is no particular limitation as to the material of the electrodes, and Ag, Au, Cu, Pt, Ni or the like is used. The electrodes are formed by means of a method such as vapor deposition, sputtering, printing or electroless plating, but other methods may also be used and there is no particular limitation as to the method of forming the electrodes.

Figure 2:
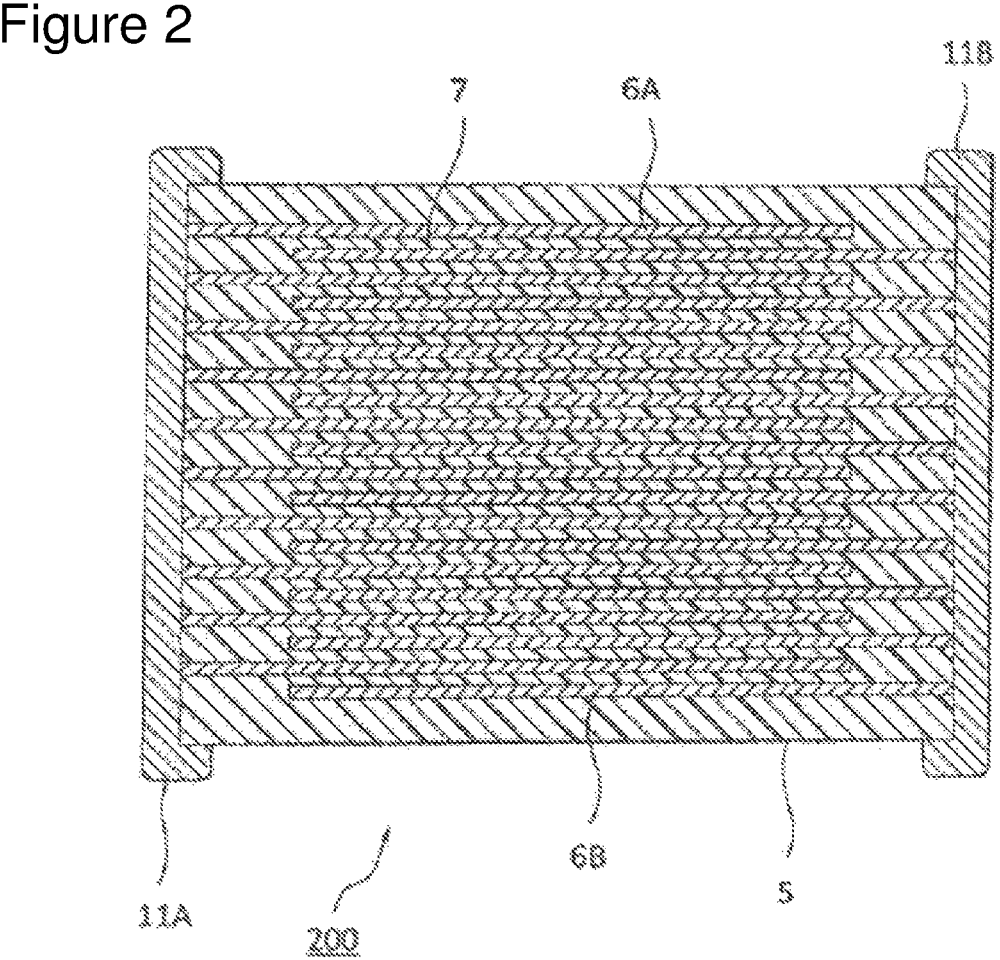
FIG. 2 is a view in cross section of a laminated ceramic capacitor according to a different mode of embodiment of the present invention.

FIG. 2 is a view in cross section of a laminated ceramic capacitor according to a different mode of embodiment of the present invention. As shown in FIG. 2, a laminated ceramic capacitor 200 according to a mode of embodiment of the present invention comprises a capacitor element main body 5 having a structure in which dielectric layers 7 and internal electrode layers 6A, 6B are alternately stacked. A pair of terminal electrodes 11A, 11B which conduct, respectively, with the internal electrode layers 6A, 6B alternately arranged inside the element main body 5 are formed at both ends of the element main body 5. There is no particular limitation as to the shape of the element main body 5, but it is normally a cuboid shape. Furthermore, there is no particular limitation as to the dimensions thereof, and suitable dimensions should be set in accordance with the application.

The dielectric layers 7 comprise the dielectric composition according to this mode of embodiment.

The thickness per layer of the dielectric layers 7 may be freely set and may be 1-100 μm, for example, but there is no particular limitation.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

A metal such as Au, Pt or Ag may be used as the material of the internal electrode layers 6A, 6B, for example, but there is no particular limitation and other metals may also be used.

The terminal electrodes 11A, 11B are provided at the end surfaces of the laminated body 5 in contact with the ends of the internal electrode layers 6A, 6B which are exposed at the end surfaces. As a result, the terminal electrodes 11A, 11B are electrically connected to the internal electrode layers 6A, 6B, respectively. The terminal electrode 11A, 11B may comprise a conductive material having Ag, Au, Cu or the like as the main component thereof. The thickness of the terminal electrodes 11A, 11B is appropriately set in accordance with the application and the size of the laminated dielectric element, among other things. The thickness may be set at 10-50 μm, but there is no particular limitation.

A single-layer ceramic capacitor and a laminated ceramic capacitor in accordance with modes of embodiment of the present invention were described above. The dielectric composition according to this mode of embodiment has a high dielectric constant and capacitance when a high DC bias is applied, and it can therefore be advantageously used for medium- and high-voltage capacitors with a relatively high rated voltage, for example.

Furthermore, the present invention is not limited to the modes of embodiment described above. For example, the dielectric layers comprising the dielectric composition according to this mode of embodiment may also be used as a dielectric element in a semiconductor device etc. For example, a thin-film capacitor or the like in which the dielectric composition according to the present invention is made into a thin film and incorporated on a substrate such as a semiconductor device may be cited as a dielectric element according to the present invention.

Furthermore, a known configuration may be freely used in this mode of embodiment, other than the dielectric composition. Furthermore, the calcined powder may be produced by means of a known method such as hydrothermal synthesis when the ceramic capacitor is produced. Furthermore, $La_{0.67}TiO_3$, $(Bi_{0.5}Na_{0.5})TiO_3$ and $SrTiO_3$, etc. may also be prepared, mixed and sintered as precursors.

The dielectric according to this mode of embodiment is a combination of ferroelectric compositions, and by providing this specific combination, it is possible to achieve a relatively high dielectric constant of 800 or greater and a withstand field of 14 V/μm or greater when a DC bias of 8 V/μm is applied. The reason for this is believed to be as follows.

The dielectric composition according to this mode of embodiment may also be referred to as a combination of ferroelectric compositions such as $La_{0.67}TiO_3$, $(Bi_{0.5}Na_{0.5})TiO_3$ and $SrTiO_3$, for example. It is possible to achieve a relatively high dielectric constant of 800 or greater and a withstand field of 14 V/μm or greater when a DC bias of at least 8 V/μm is applied by virtue of this specific combination of ferroelectric compositions.

The present invention will be described below in further detail with the aid of exemplary embodiments and comparative examples. However, the present invention is not limited to the following exemplary embodiments.

(Exemplary Embodiments 1-17 and Comparative Examples 1-12)

Powders of bismuth oxide ($Bi_2O_3$), sodium carbonate ($Na_2CO_3$), strontium carbonate ($SrCO_3$), lanthanum hydroxide ($La(OH)_3$), neodymium oxide ($Nd_2O_3$), samarium oxide ($Sm_2O_3$), gadolinium oxide ($Gd_2O_3$), dysprosium oxide ($Dy_2O_3$), ytterbium oxide ($Yb_2O_3$) and titanium oxide ($TiO_2$) were prepared as starting materials.

The abovementioned powder starting materials were then weighed out in such a way that the dielectric composition which had been fired (sintered compact) satisfied the compositions shown in table 1. It should be noted here that a, b, c and d in table 1 represent numerical values of a, b, c and d, respectively, in the following general formula (1).

$$(Bi_aNa_bSr_cLn_d)TiO_3 \qquad (1)$$

The weighed starting material powders were then wet-mixed using a ball mill, after which the resulting mixture was calcined for 2 hours at 850° C. under air in order to obtain a calcined article. The resulting calcined article was wet-ground in a ball mill to obtain calcined powder. 1 wt % of PVA was then added to the calcined powder, taking the calcined powder as 100 wt %, molding was carried out at a pressure of about 5×10² MPa, and a disk-shaped molded article having plane dimensions of the order of diameter 17 mm and thickness 1 mm was obtained.

The resulting molded article was then fired under the air at a firing temperature of 950-1400° C. and a firing time of 2-10 hours under conditions such that the relative density was 95% or greater, in order to obtain dielectric composition samples. When the density of the resulting dielectric samples was measured, the density of all the samples was 95% or greater with respect to the theoretical density.

The compositions of the resulting dielectric composition samples were analyzed. The composition was analyzed by means of X-ray fluorescence analysis. As a result, it was confirmed that the compositions of the sintered compacts were equivalent to the compositions in table 1.

Ag electrodes were vapor-deposited on both surfaces of the resulting dielectric composition samples in order to produce capacitor samples.

The dielectric constant (∈) when a DC bias of 8 V/μm was applied and the withstand field, at room temperature of 25° C., were measured for each of the resulting capacitor samples.

A DC high-voltage power source (Glassman High Voltage, WX10P90) was connected to a digital LCR meter (Hewlett-Packard, 4284A), and the dielectric constant was measured by said digital LCR meter at room temperature of 25° C. while a DC bias of 8 V/μm was applied.

The withstand field was measured using a DC high-voltage power source (Glassman High Voltage, WX10P90) by gradually applying a voltage and confirming the electric field which caused breakdown.

The dielectric constant and withstand field when a DC bias of 8 V/μm was applied at room temperature of 25° C. are shown in table 1 for each dielectric composition sample according to the exemplary embodiments and comparative examples.

It should be noted that the bar lines in the table indicate that breakdown occurred when a DC bias of 8 V/μm was applied and the dielectric constant could not be measured. Furthermore, in the exemplary embodiments, a dielectric constant of 800 or greater when a DC bias of 8 V/μm was applied was deemed to be good, and a dielectric constant of 900 or greater was deemed to be even better. Furthermore, 14 V/μm was deemed to be good for the withstand field.

TABLE 1

| | Bi | Na | Sr | Ln | | | Dielectric constant (ε) | Withstand field |
|---|---|---|---|---|---|---|---|---|
| | a | b | c | Type | d | a + b + c + d | @8 V/μm | (V/μm) |
| Exemplary Embodiment 1 | 0.48 | 0.48 | 0.01 | La | 0.02 | 0.99 | 802 | 15.7 |
| Exemplary Embodiment 2 | 0.32 | 0.32 | 0.07 | La | 0.20 | 0.91 | 881 | 16.9 |
| Exemplary Embodiment 3 | 0.40 | 0.40 | 0.14 | La | 0.04 | 0.98 | 1794 | 18.4 |
| Exemplary Embodiment 4 | 0.22 | 0.22 | 0.41 | La | 0.10 | 0.95 | 922 | 21.8 |
| Exemplary Embodiment 5 | 0.23 | 0.23 | 0.44 | La | 0.04 | 0.94 | 1657 | 25.7 |
| Exemplary Embodiment 6 | 0.26 | 0.26 | 0.49 | La | 0.04 | 1.05 | 1635 | 21.3 |
| Exemplary Embodiment 7 | 0.24 | 0.24 | 0.51 | La | 0.01 | 1.00 | 1349 | 20.4 |
| Exemplary Embodiment 8 | 0.17 | 0.17 | 0.60 | La | 0.04 | 0.98 | 1457 | 18.5 |
| Exemplary Embodiment 9 | 0.06 | 0.06 | 0.66 | La | 0.20 | 0.98 | 842 | 14.5 |
| Exemplary Embodiment 10 | 0.12 | 0.12 | 0.70 | La | 0.04 | 0.98 | 1450 | 17.3 |
| Exemplary Embodiment 11 | 0.07 | 0.07 | 0.80 | La | 0.04 | 0.98 | 867 | 21.7 |
| Exemplary Embodiment 12 | 0.23 | 0.23 | 0.44 | Gd | 0.04 | 0.94 | 1582 | 19.7 |
| Exemplary Embodiment 13 | 0.23 | 0.23 | 0.44 | Yb | 0.04 | 0.94 | 1595 | 19.2 |
| Exemplary Embodiment 14 | 0.23 | 0.23 | 0.44 | Ce | 0.04 | 0.94 | 1421 | 15.6 |

TABLE 1-continued

| | Bi | Na | Sr | Ln | | | Dielectric constant (ε) | Withstand field |
|---|---|---|---|---|---|---|---|---|
| | a | b | c | Type | d | a + b + c + d | @8 V/μm | (V/μm) |
| Exemplary Embodiment 15 | 0.23 | 0.23 | 0.44 | Sm | 0.04 | 0.94 | 1346 | 15.2 |
| Exemplary Embodiment 16 | 0.23 | 0.23 | 0.44 | Nd | 0.04 | 0.94 | 1324 | 15.5 |
| Exemplary Embodiment 17 | 0.23 | 0.23 | 0.44 | Dy | 0.04 | 0.94 | 974 | 16.4 |
| Comparative Example 1 | 0.00 | 0.00 | 0.80 | La | 0.20 | 1.00 | 278 | 26.5 |
| Comparative Example 2 | 0.50 | 0.50 | 0.00 | La | 0.00 | 1.00 | — | 6.3 |
| Comparative Example 3 | 0.47 | 0.47 | 0.00 | La | 0.04 | 0.98 | — | 6.4 |
| Comparative Example 4 | 0.05 | 0.05 | 0.81 | La | 0.06 | 0.97 | 598 | 28.1 |
| Comparative Example 5 | 0.25 | 0.25 | 0.50 | La | 0.00 | 1.00 | — | 7.2 |
| Comparative Example 6 | 0.27 | 0.27 | 0.24 | La | 0.22 | 1.00 | 829 | 10.8 |
| Comparative Example 7 | 0.30 | 0.30 | 0.07 | La | 0.22 | 0.89 | — | 7.6 |
| Comparative Example 8 | 0.26 | 0.26 | 0.50 | La | 0.04 | 1.06 | — | 5.1 |
| Comparative Example 9 | 0.00 | 0.00 | 0.80 | Gd | 0.20 | 1.00 | 187 | 22.3 |
| Comparative Example 10 | 0.00 | 0.00 | 0.80 | Yb | 0.20 | 1.00 | 198 | 19.6 |
| Comparative Example 11 | 0.00 | 0.00 | 0.80 | Ce | 0.20 | 1.00 | 232 | 17.1 |
| Comparative Example 12 | 0.00 | 0.00 | 0.80 | Sm | 0.20 | 1.00 | 215 | 16.5 |

It can be seen from the above that the dielectric compositions of Exemplary Embodiments 1-17 for which a, b, c and d satisfied: $0<a<0.50$, $0<b<0.50$, $0<c\leq0.80$, $0<d\leq0.20$, and $0.90\leq a+b+c+d\leq1.05$ had a dielectric constant of 800 or greater and a withstand field of 14 V/μm or greater when a DC bias of 8 V/μm was applied, and these compositions were in a preferred range.

In addition, the dielectric compositions of Exemplary Embodiments 3-8, 10 and 12-17 for which a, b, c and d satisfied: $0.05<a\leq0.40$, $0.05<b\leq0.40$, $0<c\leq0.70$, $0<d\leq0.10$, and $0.90\leq a+b+c+d\leq1.05$ had a dielectric constant of 900 or greater and a withstand field of 14 V/μm or greater when a DC bias of 8 V/μm was applied, and these compositions were in an especially preferred range.

In contrast to this, the dielectric compositions according to Comparative Examples 1-12 which did not satisfy at least one from among $0<a<0.50$, $0<b<0.50$, $0<c\leq0.80$, $0<d\leq0.20$, and $0.90\leq a+b+c+d\leq1.05$ had a dielectric constant of less than 800 or a withstand field of less than 14 V/μm when a DC bias of 8 V/μm was applied, or it was not possible to measure the dielectric constant.

In addition, a DC bias applied in the range of 0-8 V/μm was varied for the capacitor sample according to Exemplary Embodiment 5 and the dielectric constant was measured. The measurement result is shown in FIG. 3 together with an outline of the change in dielectric constant of a conventional BaTiO$_3$-based capacitor sample.

Figure 3:
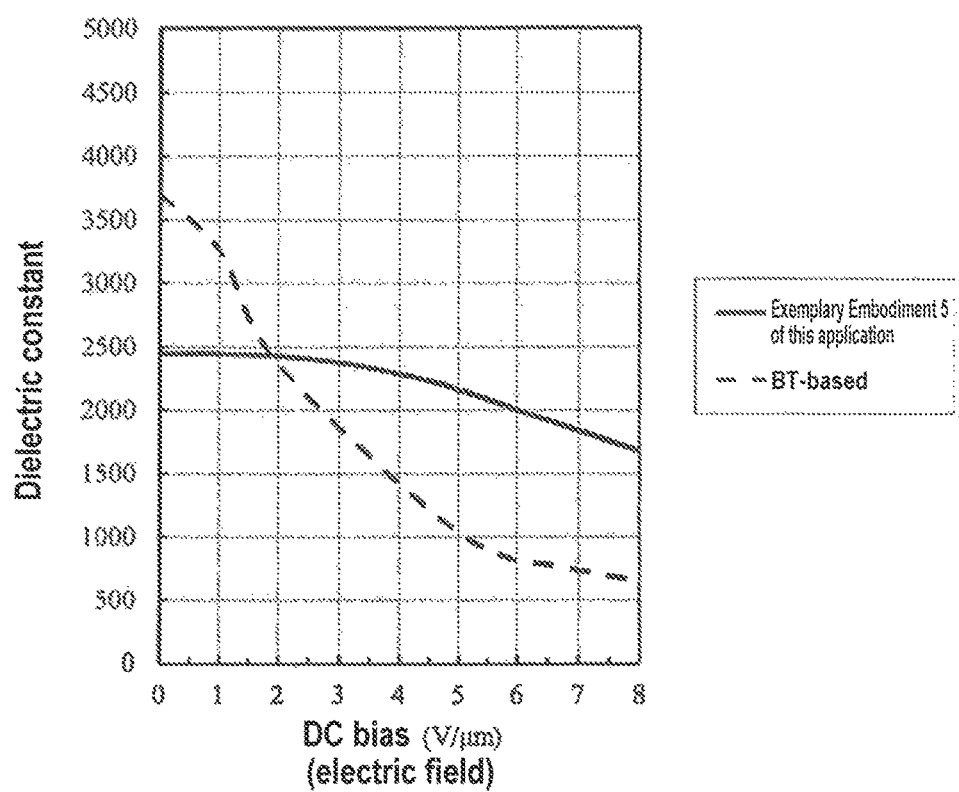
FIG. 3 is a graph schematically showing both a DC bias characteristics graph in accordance with an exemplary embodiment of the present invention, and a DC bias characteristics graph of a conventional $BaTiO_3$-based dielectric composition.

It is clear from FIG. 3 that the dielectric constant sharply dropped as the DC bias applied increased in the case of the conventional BaTiO$_3$-based capacitor sample, whereas the dielectric constant when a DC bias of 1-2 V/μm was applied was a maximum in the case of the capacitor sample having the dielectric composition according to the invention of this application, and even when the DC bias increased, a high dielectric constant was maintained.

The invention claimed is:

1. A laminated electronic component comprising:
a laminated portion including alternating layers of internal electrode layers and dielectric layers, wherein the dielectric layers comprise a dielectric composition, the dielectric composition comprising:
a main component represented by $(Bi_aNa_bSr_cLn_d)TiO_3$,
wherein Ln is at least one element selected from the group consisting of: La, Ce, Pr, Nd, Sm, Eu, Gd, Tb, Dy, Ho and Yb, and
wherein a, b, c and d satisfy the following: $0<a<0.50$, $0<b<0.50$, $0<c\leq0.80$, $0<d\leq0.20$, and $0.90\leq a+b+c+d\leq1.05$.

2. A dielectric composition comprising:
a main component represented by $(Bi_aNa_bSr_cLn_d)TiO_3$,
wherein Ln is at least one element selected from the group consisting of: Ce, Pr, Eu, Gd, Tb, Dy, Ho and Yb, and
wherein a, b, c and d satisfy the following: $0<a<0.50$, $0<b<0.50$, $0<c\leq0.80$, $0<d\leq0.20$, and $0.90\leq a+b+c+d\leq1.05$.

3. The laminated electronic component as claimed in claim 1, wherein a, b, c and d satisfy the following: $0.05<a\leq0.40$, $0.05<b\leq0.40$, $0<c\leq0.70$, $0<d\leq0.04$, and $0.90\leq a+b+c+d\leq1.05$.

4. The laminated electronic component as claimed in claim 1, wherein a=b.

5. The laminated electronic component as claimed in claim 1, wherein Ln is at least one of La, Gd, or Yb.

6. The laminated electronic component as claimed in claim 1, wherein a, b, c and d satisfy the following: $0.05<a\leq0.40$, $0.05<b\leq0.40$, $0<c\leq0.70$, $0<d\leq0.10$, and $0.90\leq a+b+c+d\leq1.05$.

7. A method for forming a laminated electronic component, the method comprising:
providing a dielectric composition for dielectric layers by:
providing starting material powders of bismuth oxide (Bi$_2$O$_3$) and sodium carbonate (Na$_2$CO$_3$), strontium carbonate (SrCO$_3$) titanium oxide (TiO$_2$) and at least one of lanthanum hydroxide (La(OH)$_3$), cerium oxide (Ce$_2$O$_3$), neodymium oxide (Nd$_2$O$_3$), samarium oxide (Sm$_2$O$_3$), gadolinium oxide (Gd$_2$O$_3$), dysprosium oxide (Dy$_2$O$_3$), or ytterbium oxide (Yb$_2$O$_3$), wherein the starting material powders are weighed out in such a way that a dielectric composition after being sintered has a main component represented by $(Bi_aNa_bSr_cLn_d)TiO_3$ and the combination of a, b, c and d satisfy the following conditions: $0<a<0.50$, $0<b<0.50$, $0<c\leq0.80$, $0<d\leq0.20$, and $0.90\leq a+b+c+d\leq1.05$;
wet-mixing the weighed starting material powders;
obtaining a calcined article by calcining the mixture obtained by wet-mixing;
after drying the calcined article, wet-grounding the calcined article to obtain calcined powder; and
adding a binder to the calcined powder; and
stacking the dielectric layers and electrode layers thereby forming the laminated electronic component, wherein the dielectric layers comprise the dielectric composition.

8. The laminated electronic component according to claim 1, wherein the laminated electronic component is a laminated ceramic capacitor comprising a capacitor element main body;

wherein the capacitor element main body comprises the laminated portion; and wherein the laminated portion has the dielectric layers alternately stacked with the internal electrode layers.

9. The laminated electronic component according to claim 8, further comprising a pair of terminal electrodes, wherein a terminal electrode of the pair of terminal electrodes is formed at each end of the capacitor element main body and wherein each terminal electrode of the pair of terminal electrodes conducts, respectively, with the internal electrode layers alternately arranged inside the element main body.

10. The laminated electronic component according to claim 9, wherein each terminal electrode of the pair of terminal electrodes comprises a conductive material having silver (Ag), gold (Au), or copper (Cu) as the main component thereof.

11. The laminated electronic component according to claim 8, wherein each internal electrode layer is substantially formed from a metal, wherein the metal is one of gold (Au), platinum (Pt), or silver (Ag).

12. The dielectric composition according to claim 2, wherein the dielectric composition forms a disk-shaped dielectric body of a single-layer ceramic capacitor that comprises the disk-shaped dielectric body and a pair of electrodes.

13. The dielectric composition according to claim 12, wherein the pair of electrodes of the single-layer ceramic capacitor having the disk-shaped dielectric body formed by the dielectric composition is substantially formed from at least one of silver (Ag), gold (Au), copper (Cu), platinum (Pt), or nickel (Ni).

* * * * *